Patented Feb. 26, 1929.

1,703,150

UNITED STATES PATENT OFFICE.

GEORG KALISCHER AND KARL KELLER, OF FRANKFORT-ON-THE-MAIN, GERMANY, ASSIGNORS TO GRASSELLI DYESTUFF CORPORATION, OF NEW YORK, N. Y., A CORPORATION OF DELAWARE.

ORTHO HALOGEN SUBSTITUTED AROMATIC QUATERNARY AMMONIUM COMPOUNDS AND PROCESS OF MAKING THE SAME.

No Drawing. Application filed July 8, 1926, Serial No. 121,282, and in Germany July 15, 1925.

Our invention pertains to novel ammonium compounds which are sulfo salts of trialkyl-aryl-ammonium bases in which the aryl nucleus is substituted by halogen and in processes of making the same.

We have now found that ortho halogen substituted aryl-dialkyl amines react readily with sulfuric acid alkyl-esters and aryl-sulfo-acid alkyl-esters with formation of the sulfo salts of the trialkyl-aryl-ammonium bases.

It is well known that the readiness with which alkylating agents react with bases greatly depends upon the alkalinity of the base, the stronger the base the easier the alkylation proceeds. The introduction of negative substituents, such as halogen, into the aryl nucleus of aromtic tertiary amines, particularly when in ortho position, decreases considerably the strength of these amines and consequently their reactivity towards alkylating agents and it was hardly to be expected that they could be alkylated by the use of sulfuric acid alkyl-esters and aryl-sulfo-acid aryl esters.

Our novel reaction consists in bringing together about mono-molecular proportions of the halogen substituted aryl-dialkyl-amine and the sulfuric acid ester or the aryl-sulfonic acid ester and heating until the reaction is completed. Carrying out the reaction in presence of a solvent is in many cases of advantage and we found indifferent solvents such as mono-chlor-benzene, toluene, etc. to be exceedingly useful for this purpose. The ammonium sulfo salts obtained mostly crystallize from the reaction mixture or from the solvent and can usually be used directly as obtained.

The halogenated aromatic tertiary amines particularly useful in our novel process are the ortho chloro and bromo substituted aryl-dialkyl-amines of the benzene or naphthalene series, having the type formula:

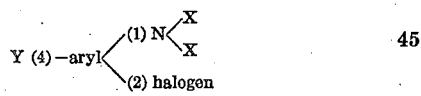

in which aryl stands for the benzene or naphthalene nucleus, and the two X's stand for alike or different alkyl groups, and Y for hydrogen, halogen, an alkyl, aryl or aralkyl group.

A convenient manner of producing the tertiary amines suitable for the novel process is described in our co-pending application, Serial No. 121,281, filed July 8, 1926, and consists in acting with chlorine or bromine upon the mineral acid salts of aromatic tertiary amines, by which process predominently ortho substituted aromatic tertiary amines are produced.

The alkylating agents used in our novel process are the sulfuric acid alkyl esters such as dimethyl-sulfate, diethyl sulfate etc. and the aryl-sulfonic acid-alkyl-esters such as p-toluol-sulfonic acid methyl ester etc. These compounds can be represented by the formula

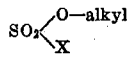

in which X stands for an aryl group or an O-alkyl group.

For purposes of this invention we will call the ammonium salts obtained "sulfo" salts, it being understood that the acid radicle is of the formula—$SO_2$—X in which again X stands for an aryl or O-alkyl group.

Our novel sulfo salts of trialkyl-aryl ammonium bases, substituted in the aryl nucleus in ortho position to the nitrogen by halogen, particularly chlorine or bromine, are mostly well crystallized compounds; they are easily soluble in water, mostly soluble in alcohol and difficultly soluble in organic solvents. They can be used as alkylating agents, the same as alkyl-halogenids.

Amongst our novel sulfo salts we found to be particularly valuable the ammonium sulfo salts of the crude halogen-dimethyl-aniline as obtained according to the process described in our co-pending application Serial No. 121,281 filed July 8, 1926 which consists in acting with about 1 to 2 molecular proportions of chlorine or bromine upon one molecular proportion of the hydrochloride, or hydrobromide of dimethyl-aniline and which consists mainly of o-halogen-dimethyl-aniline and of o-p-dihalogen-dimethyl-aniline respectively.

The following examples will further illustrate our invention, but it is understood that our invention is not limited to the particular proportions, reacting conditions or materials listed therein.

*Example 1.*—16,9 kilos 3-chloro-4-dimethylamino-toluene are mixed with 18,8 kilos p-toluol-sulfonic acid methyl ester and heated with stirring for several hours in a kettle set up in a water bath. After some time the product solidifies to a crystalline mass of the 3-chloro-1-methylbenzene-4-trimethyl-ammonium p-toluolsulfonic acid salt. By dissolving the reaction mass in alcohol and precipitating with ether the sulfo salt is obtained as water soluble colorless prisms, melting at about 154° C.

The reaction proceeds as follows:

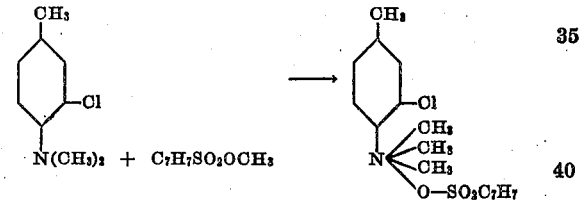

*Example 2.*—41 kilos 1-chloro-2-dimethylamino-naphthalene are mixed with 26 parts dimethylsulfate. The reaction starts quickly and colorless crystals separate from the solution after some time; the reaction is carried to completion by heating for several hours to 80–90° C. The product has then solidified to a crystalline mass which consists of practically pure 1-chloro-naphthalene-2-trimethylammonium sulfomethyl ester salt. By dissolving it in alcohol and precipitating with ether it is obtained as water soluble colorless needles, melting, after previous softening, at 98° C. The reaction proceeds as follows:

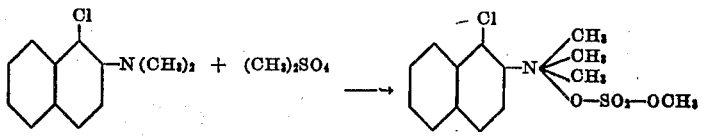

*Example 3.*—17 kilos of the crude chlorodimethylaniline as obtained by chlorinating one molecular proportion of dimethyl-aniline hydrochloride with about 1½ molecular proportions of chlorine according to our copending application Serial No. 121,281 filed July 8, 1926, and consisting predominantly of o-chloro-dimethylaniline with lesser amounts of o-p-dichloro-dimethylaniline and unreacted dimethylaniline, are mixed with 14,5 kilos dimethyl-sulfate. A clear solution is obtained from which after some time and upon heating an oil separates, the temperature is then increased to 115–120° C. and kept around 100° C. until a sample diluted with water remains nearly clear on addition of excess caustic soda. The reaction product solidifies on cooling to a yellowish crystalline mass consisting predominantly of the o-chloro and o-p-dichloro phenyl-trimethyl ammonium sulfomethyl ester salt. The crude product as obtained can be used directly for alkylations.

The reaction proceeds as follows:

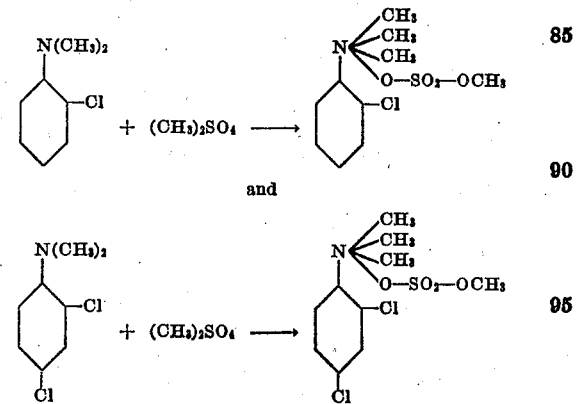

*Example 4.*—65 kilos 3.3′-dichloro-4.4′-tetramethyldiamino-diphenylmethane are dissolved in 90 kilos monochlorbenzene and heated to near the boiling point. 51 kilos dimethylsulfate are run in at such a rate that the reaction mass is kept at a moderate boil due to the reaction temperature. A separation of crystals already takes place during this phase of the reaction. The mass is then stirred for a little while longer at boiling temperature and after cooling the crystals are filtered off. They are the disulfomethyl ester salt of the 3.3'-dichloro-4.4'-hexamethyldiamino-diphenyl-methane. The crude product so obtained can be further purified by washing with ether, its melting point is then at about 218° C. with evolution of gas. The reaction proceeds as follows:

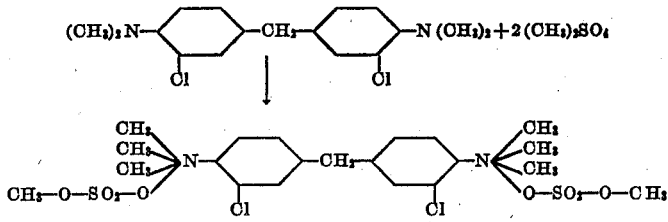

When using di-ethylsulfate instead of dimethyl-sulfate a similar product is produced.

We claim:

1. In processes of making o-halogen substituted aryl-trialkyl-ammonium sulfo salts the step comprising reacting with alkylating agents of the formula:

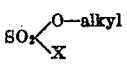

in which X stands for an aryl group or O-alkyl group upon aryl-dialkyl amines in which the aryl group is substituted in ortho position to the nitrogen by one of the halogens, chlorine or bromine.

2. In processes of making o-halogen substituted aryl-trialkyl-ammonium sulfo salts the step comprising reacting in presence of an indifferent solvent with alkylating agents of the formula:

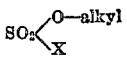

in which X stands for an aryl group or O-alkyl group, upon aryl-dialkylamines in which the aryl group is substituted in ortho position to the nitrogen by one of the halogens, chlorine or bromine.

3. In processes of making o-halogen substituted aryl-trialkyl ammonium sulfo salts the step comprising reacting with dimethylsulfate upon aryl-dialkylamines in which the aryl group is substituted in ortho position to the nitrogen by one of the halogens, chlorine or bromine.

4. The process of acting with alkylating agents of the formula:

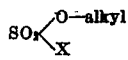

in which X stands for an aryl group or O-alkyl group, upon 3.3'-dihalogen-4.4'-tetraalkyldiamino-diphenylmethane, the halogen belonging to the group comprising chlorine and bromine.

5. The process of acting with dimethylsulfate upon 3.3' - dichlor - 4.4' - tetra - alkyldiamino-diphenylmethane.

6. As new products sulfo salts of ortho halogen, substituted aryl-trialkyl ammonium bases which are easily soluble in water, mostly soluble in alcohol and difficultly soluble in organic solvents.

7. As a new product the sulfo salt of the 3.3' - dichlor - diphenylmethane - 4.4' - di-trimethylammoniumhydroxide substantially identical with the product obtained by the action of dimethyl sulfate upon 3.3'-dichlor-4.4' - tetramethyl-diamino-diphenylmethane, which is a crystalline body, easily soluble in water and melting at about 218° C. with evolution of gas.

In testimony whereof, we affix our signatures.

GEORG KALISCHER.
KARL KELLER.